(12) United States Patent
Bergevin et al.

(10) Patent No.: US 7,108,796 B2
(45) Date of Patent: Sep. 19, 2006

(54) METHOD FOR FABRICATION OF MAGNETIC WRITE HEAD WITH SELF ALIGNED POLES

(75) Inventors: Christopher W. Bergevin, San Jose, CA (US); James D. Jarratt, Schenectady, NY (US); Jyh-Shuey Jerry Lo, San Jose, CA (US); Sue Siyang Zhang, Saratoga, CA (US)

(73) Assignee: Hitachi Global Storage Technologies Netherlands, B.V., Amsterdam (NL)

( * ) Notice: Subject to any disclaimer, the term of this patent is extended or adjusted under 35 U.S.C. 154(b) by 0 days.

(21) Appl. No.: 10/676,466

(22) Filed: Sep. 30, 2003

(65) Prior Publication Data
US 2005/0067375 A1    Mar. 31, 2005

(51) Int. Cl.
*G11B 5/127* (2006.01)
*B44C 1/22* (2006.01)

(52) U.S. Cl. ............... 216/22; 216/41; 29/603.13; 29/603.15; 360/313

(58) Field of Classification Search ............... 216/22, 216/41; 29/603.13, 603.15; 360/313
See application file for complete search history.

(56) References Cited

U.S. PATENT DOCUMENTS

| | | | | |
|---|---|---|---|---|
| 5,843,521 A | * | 12/1998 | Ju et al. | 428/336 |
| 6,329,211 B1 | * | 12/2001 | Terunuma et al. | 438/3 |
| 6,859,998 B1 | * | 3/2005 | Kruger et al. | 29/603.13 |

\* cited by examiner

*Primary Examiner*—Shamim Ahmed
(74) *Attorney, Agent, or Firm*—Larry B. Guernsey; Intellectual Property Law Offices

(57) ABSTRACT

A method for fabrication of magnetic write heads for disk drives in which a P1 layer is formed having a P1 Protrusion, the P1 Protrusion having a longitudinal reference axis. A gap layer is deposited on the P1 Protrusion and a layer of fill material is deposited on the gap layer. The fill material layer is shaped to form a mold which surrounds a hollow which is aligned with the longitudinal axis of the P1 Protrusion. This hollow in the fill material layer is filled with P2 pole material to form a P2 pole which is then automatically substantially aligned with the longitudinal axis of the P1 Protrusion.

19 Claims, 4 Drawing Sheets

METHOD FOR FABRICATION OF MAGNETIC WRITE HEAD WITH SELF ALIGNED POLES

BACKGROUND OF THE INVENTION

1. Field of the Invention

The present invention relates generally to manufacture of heads for data storage devices and more specifically to a write head with first and second pole tips which are self aligned during the manufacturing process.

2. Description of the Prior Art

A computer disk drive stores and retrieves data by positioning a magnetic read/write head over a rotating magnetic data storage disk. The head, or heads, which are typically arranged in stacks, read from or write data to concentric data tracks defined on surface of the disks which are also typically arranged in stacks. The heads are included in structures called "sliders" into which the read/write sensors are imbedded during fabrication. The goal in recent years is to increase the amount of data that can be stored on each hard disk. If data tracks can be made narrower, more tracks will fit on a disk surface, and more data can be stored on a given disk. The width of the tracks depends on the width of the poles in read/write head used, and in recent years, track widths have decreased as the size of read/write heads have become progressively smaller. This decrease in track width has allowed for dramatic increases in the recording density and volume of data storage of disks.

The type of head for writing data is generally configured with two poles separated by a gap layer of non-magnetic material. These are generally referred to as the first pole or P1 and the second pole P2, with a non-magnetic gap layer between them. Recently, a design has come into use in which the P1 pole is configured with a protrusion or protrusion, which is sometimes referred to as a P1P or P1 Protrusion. This protrusion or protrusion enables magnetic flux to be channeled and concentrated to a smaller area. In order to maintain the advantage of this narrowed P1P structure in concentrating flux lines, it is advantageous for the P2 pole to be similarly narrow at the pole tip. The two pole tips of P1P ands P2 must also be in precise alignment in order for good performance of the write head. Thus, there is the difficulty of aligning two components whose dimensions may be on the order of 0.4 μm (0.4×10−6 meters) in width. Obviously, aligning two independently fabricated elements of such small magnitude would be a difficult task, and it would be much preferable to have the poles "self-aligned" or fabricated in proper registration with each other to begin with.

Thus, there is a great need for a write head having self-aligned poles and for a method of manufacture which produces this type of write head.

SUMMARY OF THE INVENTION

A method for fabrication of magnetic write heads for disk drives is described according to the preferred method of the present invention. A P1 layer is formed having a P1 Protrusion, the P1 Protrusion having a longitudinal reference axis. A gap layer is deposited on the P1 Protrusion and a layer of fill material is deposited on the gap layer. The fill material layer is shaped to form a mold mask which surrounds a hollow which is aligned with the longitudinal axis of the P1 Protrusion. This hollow in the fill material layer is filled with P2 pole material to form a P2 pole which is then automatically substantially aligned with the longitudinal axis of the P1 Protrusion.

The fill layer material can then be removed to leave a P1/gap/P2 structure, which is then trimmed to obtain the final track width. A second fill material is used to fill around the P1/gap/P2 structure, and portions of the second fill material are removed to expose the P2 pole.

It is an advantage of the present invention that poles of very narrow dimension can be fabricated that will be aligned without the problems associated with aligning two elements of such tiny dimensions.

It is a further advantage of the present invention that by self-aligning the poles, the need for handling and fixturing is reduced compared to other methods by which the poles may be aligned.

It is another advantage of the present invention that the invention requires less dependency on photolithography which will increase consistency in production runs.

It is yet another advantage of the present invention that it can be practiced with existing production equipment and techniques.

These and other features and advantages of the present invention will no doubt become apparent to those skilled in the art upon reading the following detailed description which makes reference to the several figures of the drawing.

IN THE DRAWINGS

The following drawings are not made to scale as an actual device, and are provided for illustration of the invention described herein.

DETAILED DESCRIPTION OF THE PREFERRED EMBODIMENTS

Please note that dimensions discussed below are not to be construed as limitations, but are merely representative of preferred dimensions. Many variations in dimensions are possible as will be obvious to one skilled in the art, and all are contemplated by the present invention. Also please note that no attempt has been made to draw the layers and structures to accurate scale, and relative thicknesses of layers are not meant to be in true proportions or construed as limitations on relative dimensions of elements.

The following discussion refers to all FIGS. 1–12 generally.

Figure 1:
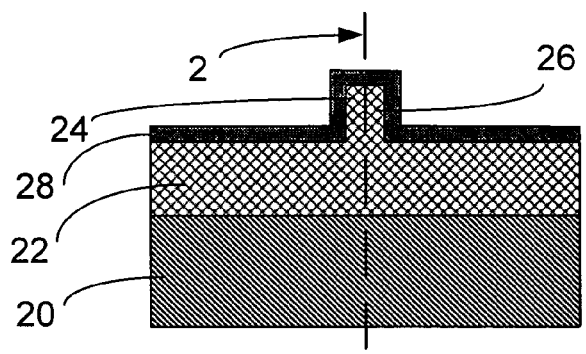
FIG. 1 is cross-sectional view of a first stage in the fabrication of self-aligned poles as practiced by the present invention.

As seen in FIG. 1, the P1 Protrusion 26, which shall alternately be referred to as P1P 26 is formed by first forming the P1 layer 20, preferably formed from CoFe, NiFe, CoFeN, or CoNiFe, and then plating the N3 layer 22, which is also high magnetic-moment material such as CoFe, NiFe, CoFeN, and CoNiFe. The N3 layer 22 then undergoes CMP (Chemical Mechanical Polishing). The P1P layer 24 is then plated onto the N3 layer 22 using a photoresist mask (not shown) to form the P1 Protrusion 26, which is preferably on the order of 0.2–0.3 μm wide and 0.5 μm in height and also preferably made from material such as CoFe, NiFe, CoFeN, and CoNiFe. It is noted that the P1 Protrusion 26 can be thought of as having a longitudinal axis 2, to which the other pole, P2 (shown in later stages) is to be aligned if good performance is to be obtained.

It may be noted that what is being referred to as the P1P or P1 Protrusion has also been historically referred to in the industry as a P1N or P1Notch, from the practice of forming the protrusion from a flat plane which is then notched on either side of a protrusion which is left behind. The habit has remained of referring to this protrusion as a "notch", however for the purposes of this application, this structure shall be referred to as a P1Protrusion or P1P to conform more closely to common English usage.

A gap layer 28 is then deposited which is preferably $SiO_2$, Ta, Rh, Ta/Rh, Pd or Ru or may be an Al2O3 gap and seed layer, to produce the structure seen in FIG. 1.

Figure 2:
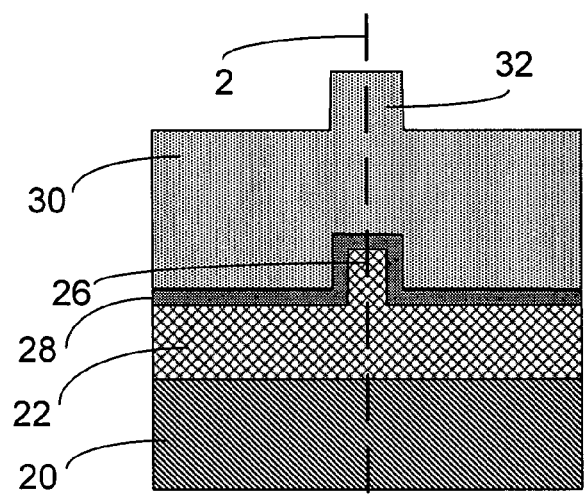
FIG. 2 is cross-sectional view of a following stage in the fabrication of self-aligned poles as practiced by the present invention.

FIG. 2 shows the result of the next stage of fabrication. A fill layer 30 of material such as SiO2, Si3N4, SiC, or TaC. is deposited to a depth of 0.5–1 μm, which reproduces the P1P protrusion 26 in a corresponding protrusion 32 of fill material. Ion milling is then used to reduce the width of the fill material protrusion 32 to match the width of the P1P and gap layer 28 dimension. Note that the fill material protrusion 32 and the P1P Protrusion 26 are aligned on the common longitudinal axis 2. FIG. 2 shows the results of this series of operations.

Figure 3:
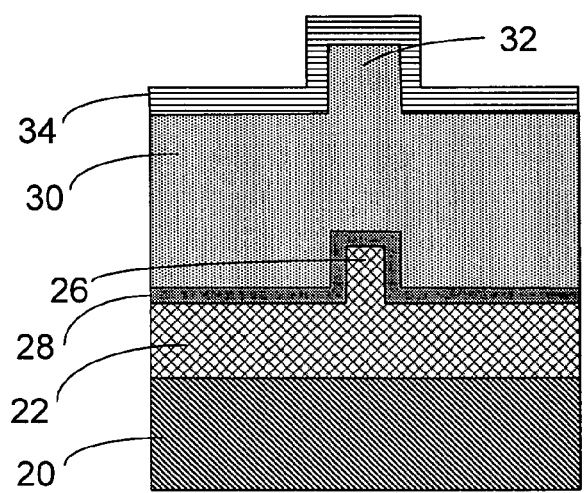
FIG. 3 is cross-sectional view of a following stage in the fabrication of self-aligned poles as practiced by the present invention.

Next, a layer of RIE masking material 34, such as NiFe, Ta, W or Cr., is deposited to a preferable depth of 0.3 μm., as shown in FIG. 3.

Figure 4:
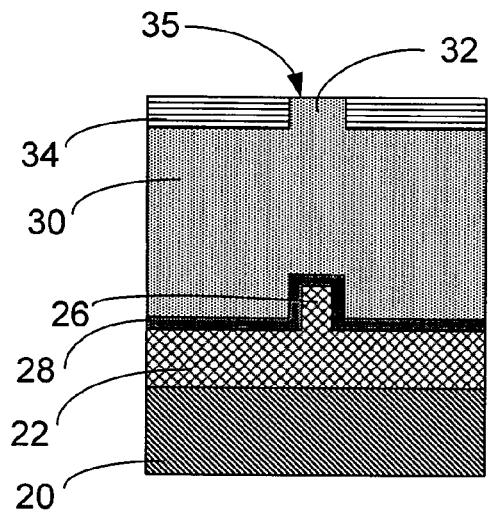
FIG. 4 is cross-sectional view of a following stage in the fabrication of self-aligned poles as practiced by the present invention.
Figure 5:
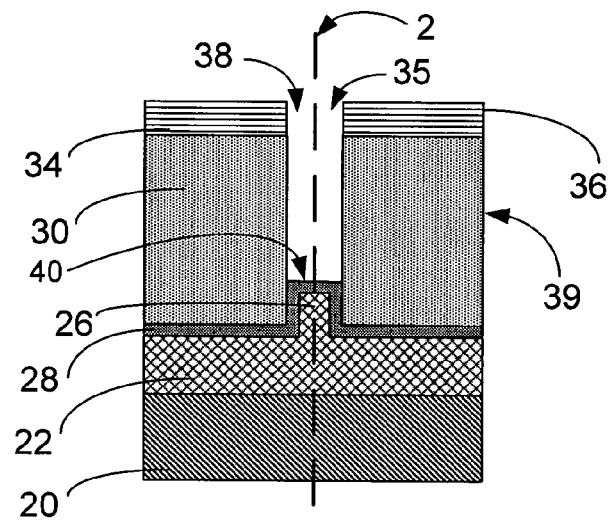
FIG. 5 is cross-sectional view of a following stage in the fabrication of self-aligned poles as practiced by the present invention.
Figure 6:
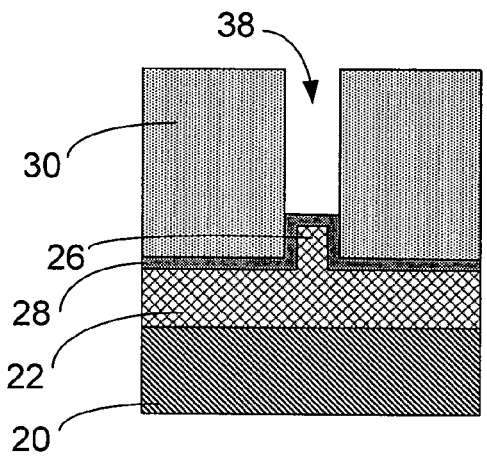
FIG. 6 is cross-sectional view of a following stage in the fabrication of self-aligned poles as practiced by the present invention.

CMP is next used to planarize the top surface of the RIE masking layer 34 and expose the SiO2 fill material protrusion 32, as shown in FIG. 4.

The RIE masking layer 34 is resistant to Reactive Ion Etching (RIE) and acts as an RIE mask 36 to the bulk of the fill material layer 30, while leaving the fill material protrusion 32 and the material below it exposed to the RIE process. The fill material layer 30 is thus formed to produces a kind of thick secondary mask or a mold mask 39, as it will be termed here, having an opening 35 which extends into a hollow shaft 38, in the fill layer material 30. It is important to note that this hollow shaft 38 in the mold mask 39 is still aligned with a longitudinal axis 2 of the P1Protrusion 26. The gap layer 28 acts as a stop or endpoint layer 40, to limit the extent of RIE process which forms the hollow shaft 38, thus producing the configuration shown in FIG. 5.

Figure 7:
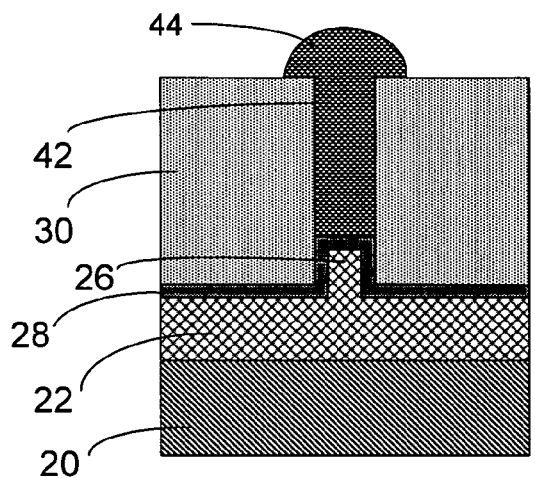
FIG. 7 is cross-sectional view of a following stage in the fabrication of self-aligned poles as practiced by the present invention.

Photoresist (not shown) is then used to protect the gap layer 28 at the end of the hollow shaft 38 from chemical etching, which is then used to remove the RIE mask 36. The photoresist is then removed, producing the results seen in FIG. 6. Next, the hollow shaft 38 (see FIG. 6) is filled by plating with preferably a material such as CoFe, NiFe, CoFeN, CoNiFe or some other high magnetic moment materials to begin formation of P2 42. A mushroom portion 44 is preferably created, as shown in FIG. 7.

Figure 8:
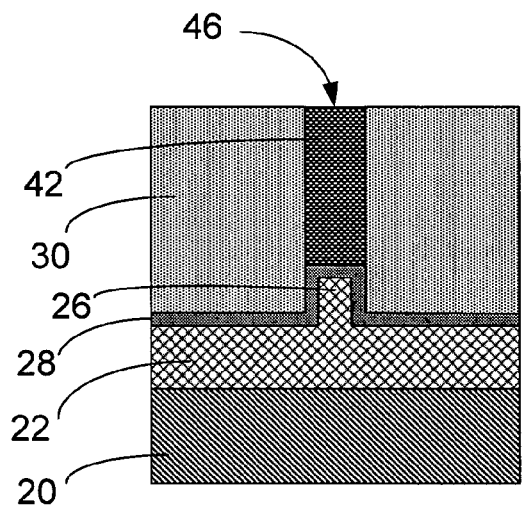
FIG. 8 is cross-sectional view of a following stage in the fabrication of self-aligned poles as practiced by the present invention.
Figure 9:
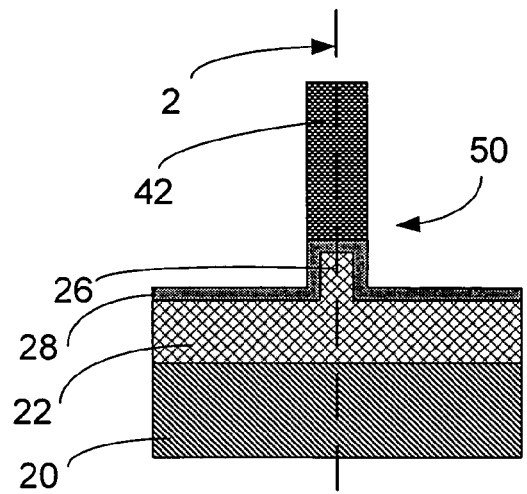
FIG. 9 is cross-sectional view of a following stage in the fabrication of self-aligned poles as practiced by the present invention.

The P2 42 is then subjected to a light CMP polish to remove the mushroom 44, leaving a flat top surface 46 to P2 42, as seen in FIG. 8. Thus a P1P and P2 have been produced which are in substantial alignment with each other without the need for attempting to orient two components of such minute dimensions in relation to each other.

Once the aligned poles have been established, then it is desirable to refine them by further processing. RIE is used again to remove the SiO2 fill 30, resulting in the structure shown in FIG. 9. The P2 42 is then left temporarily freestanding, and note that it is still aligned with the P1 Protrusion 26 on its longitudinal axis 2 to form a P1P/gap/P2 structure 50.

Figure 10:
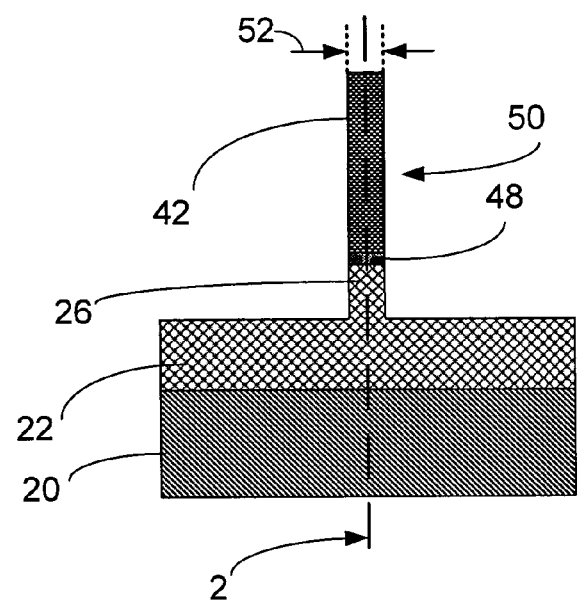
FIG. 10 is cross-sectional view of a following stage in the fabrication of self-aligned poles as practiced by the present invention.

Ion milling is then used to remove the residual gap layer material 28 (see FIG. 9) to form the final write gap 48. The P1 Protrusion 26 and the P2 42 are also trimmed to the final track width 52. The ion milling is performed by rotating the wafer 360 degrees so that material is removed equally from both sides of the P1P/gap/P2 structure 50, thus retaining the alignment of the P1 and P2 pole tips 26, 42 and write gap 48 on the common axis, as shown in FIG. 10.

A fill is then performed by depositing a second fill material layer 54, preferably a material such as $Al_2O_3$, $SiO_2$, $Si_3N_4$ or SiC, to surround the pole tips 26, 42 and write gap 48. The deposition produces a corresponding Al2O3 protrusion 56 above the P2 42, producing the structure seen in FIG. 11.

Figures 11, 12:
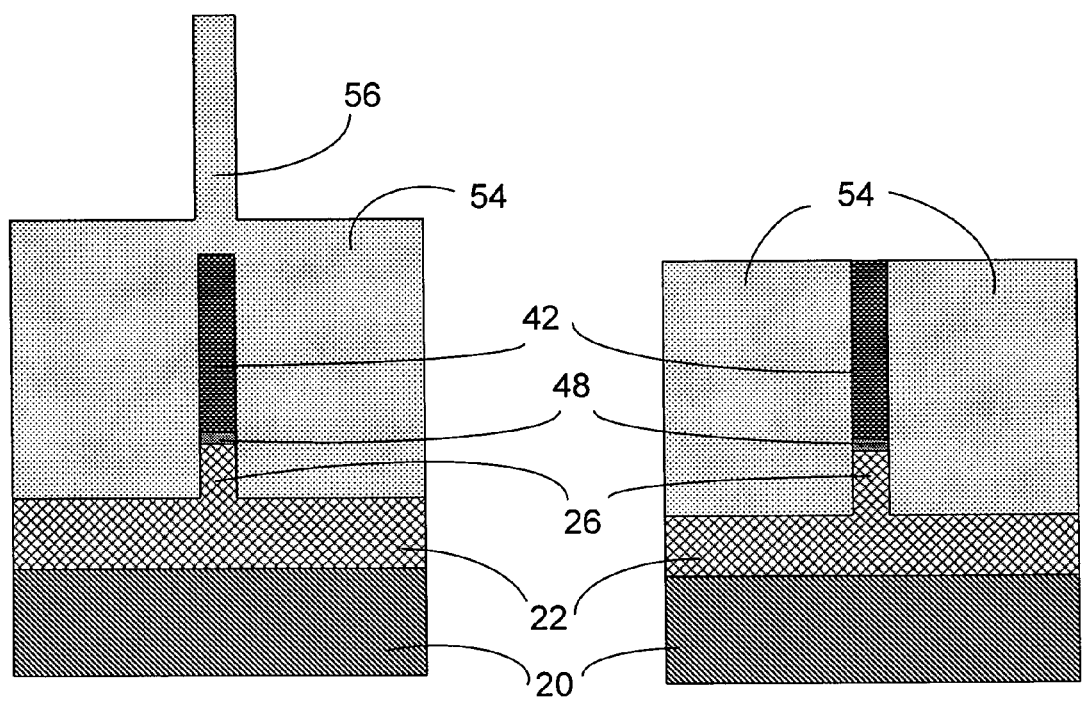
FIG. 11 is cross-sectional view of a following stage in the fabrication of self-aligned poles as practiced by the present invention.
FIG. 12 is cross-sectional view of a following stage in the fabrication of self-aligned poles as practiced by the present invention.

CMP is then performed to remove the Al2O3 protrusion 56 (see FIG. 11), and to expose the P2 42 at its upper edge to produce the structure shown in FIG. 12.

The remainder of the fabrication may be completed using standard techniques.

The present invention thus allows fabrication of two very narrow poles that are very precisely aligned without the problems of alignment that previous methods had encountered. The present invention is expect to make the fabrication of very narrow pole pieces much easier and less costly, and will aid in increases in areal density for magnetic media, and thus higher storage capacities.

While the present invention has been shown and described with regard to certain preferred embodiments, it is to be understood that modifications in form and detail will no doubt be developed by those skilled in the art upon reviewing this disclosure. It is therefore intended that the following claims cover all such alterations and modifications that nevertheless include the true spirit and scope of the inventive features of the present invention.

What is claimed is:

1. A method for fabrication of magnetic write heads for disk drives, comprising:

A) forming a P1 layer having a P1 Protrusion, said P1 Protrusion having a longitudinal axis;
B) depositing a gap layer on said P1 Protrusion;
C) forming a fill material layer on said gap layer, said fill material layer being shaped to form a mold mask which surrounds a hollow which is substantially aligned with said longitudinal axis of said P1 Protrusion; and
D) filling said hollow in said fill material layer with P2 pole material to form a P2 pole which is substantially aligned with said P1 Protrusion.

2. The method of fabrication of claim 1, further comprising:
E) removing said fill layer material to leave a P1/gap/P2 structure;
F) trimming said P1/gap/P2 structure to obtain the final track width;
G) filling around said P1/gap/P2 structure with a second fill material; and
H) removing portions of said second fill material to expose said P2 pole.

3. The method of fabrication of claim 1, wherein A) further comprises:
i) depositing an N3 layer of high magnetic moment material on said P1 layer; and
ii) forming a P1 Protrusion on said N3 layer.

4. The method of fabrication of claim 2, wherein ii) further comprises:
1) applying, exposing and developing photoresist to create a pattern for said P1 Protrusion;
2) plating pole material into the photo-resist pattern to form said P1 Protrusion; and
3) stripping said photo-resist.

5. The method of fabrication of claim 1, wherein:
said P1 pole material is chosen from a group consisting of CoFe, NiFe, CoFeN, CoNiFe and high magnetic moment materials.

6. The method of fabrication of claim 3, wherein:
said N3 layer material is chosen from a group consisting of CoFe, NiFe, CoFeN, CoNiFe and high magnetic moment materials.

7. The method of fabrication of claim 3, wherein:
said P1 Protrusion pole material is chosen from a group consisting of CoFe, NiFe, CoFeN, CoNiFe and high magnetic moment materials.

8. The method of fabrication of claim 1, wherein:
said gap layer material is chosen from a group consisting of $Al_2O_3$, $SiO_2$, Ta, Rh, Ta/Rh, Pd and Ru.

9. The method of fabrication of claim 1, wherein:
said fill layer material is chosen from a group consisting of SiO2, Si3N4, SiC, and TaC.

10. The method of fabrication of claim 1, wherein C) further comprises:
i) forming a RIE mask on said fill layer, said mask maintaining substantial alignment with said longitudinal axis of said P1 Protrusion;
ii) etching by RIE to remove fill layer material to form a hollow which is substantially aligned with said longitudinal axis of said P1 Protrusion; and
iii) removing said RIE mask.

11. The method of claim 10, wherein:
said RIE mask material is chosen from a group consisting of NiFe, Ta, W and Cr.

12. The method of claim 1, wherein:
said P2 pole material is chosen from a group consisting of CoFe, NiFe, CoFeN, and CoNiFe.

13. The method of claim 2, wherein:
said second fill material is chosen from a group consisting of $Al_2O_3$, $SiO_2$, $Si_3N_4$ and SiC.

14. The method of claim 1, wherein D) further comprises:
i) plating with P2 pole material to form a mushroom portion; and
ii) performing CMP to remove said mushroom portion.

15. The method of claim 2, wherein E) comprises:
i) etching by using RIE to remove said fill layer material.

16. The method of claim 2, wherein F) comprises:
i) using ion milling to trim said P1/gap/P2 structure to obtain the final track width.

17. The method of claim 2, wherein H) comprises:
i) using CMP to remove said portions of said second fill material to expose said P2 pole.

18. A method for fabrication of magnetic write heads for disk drives, comprising:
A) forming a P1 layer;
B) forming an N3 layer of high magnetic moment material on said P1 layer;
C) forming a P1 Protrusion on said N3 layer, said P1 Protrusion having a longitudinal axis;
D) depositing a gap layer on said P1 Protrusion;
E) forming a fill layer on said gap layer;
F) forming a RIE mask on said fill layer;
G) etching by RIE to remove fill layer material to form a hollow which is aligned with said longitudinal axis of said P1 Protrusion;
H) removing said RIE mask;
I) filling said hollow in said fill material layer with pole material to form a P2 pole;
J) etching by RIE to remove said fill layer material to leave a P1/gap/P2 structure which maintains alignment with said longitudinal axis of said P1 Protrusion;
K) trimming said P1/gap/P2 structure to obtain the final track width;
L) filling with second fill material around said P1/gap/P2 structure; and
M) removing portions of said second fill material to expose said P2 pole.

19. A method for fabrication of magnetic write heads for disk drives, comprising:
A) forming a P1 layer having a P1 Protrusion, said P1 Protrusion having a longitudinal axis;
B) depositing a gap layer on said P1 Protrusion,
C) forming a fill layer on said gap layer, said fill layer having a protrusion which is substantially aligned with said P1 Protrusion longitudinal axis;
D) forming a RIE mask on said fill layer, said mask having an opening at said fill layer protrusion which maintains substantial alignment with said longitudinal axis of said P1 Protrusion;
E) etching by RIE to remove fill layer material to form a hollow which is aligned with said longitudinal axis of said P1 Protrusion;
F) removing said RIE mask;
G) filling said hollow in said fill material layer with material to form a P2 pole;
H) etching by RIE to remove said fill layer material to leave a P1/gap/P2 structure which maintains alignment with said longitudinal axis of said P1 Protrusion;
I) trimming said P1/gap/P2 structure to obtain the final track width;
J) filling with second fill material around said P1/gap/P2 structure; and
K) removing portions of said second fill material to expose said P2 pole.

* * * * *